Oct. 4, 1938.  C. R. MARTIN  2,132,307
ROLLER GATE
Filed Jan. 9, 1936  6 Sheets-Sheet 1
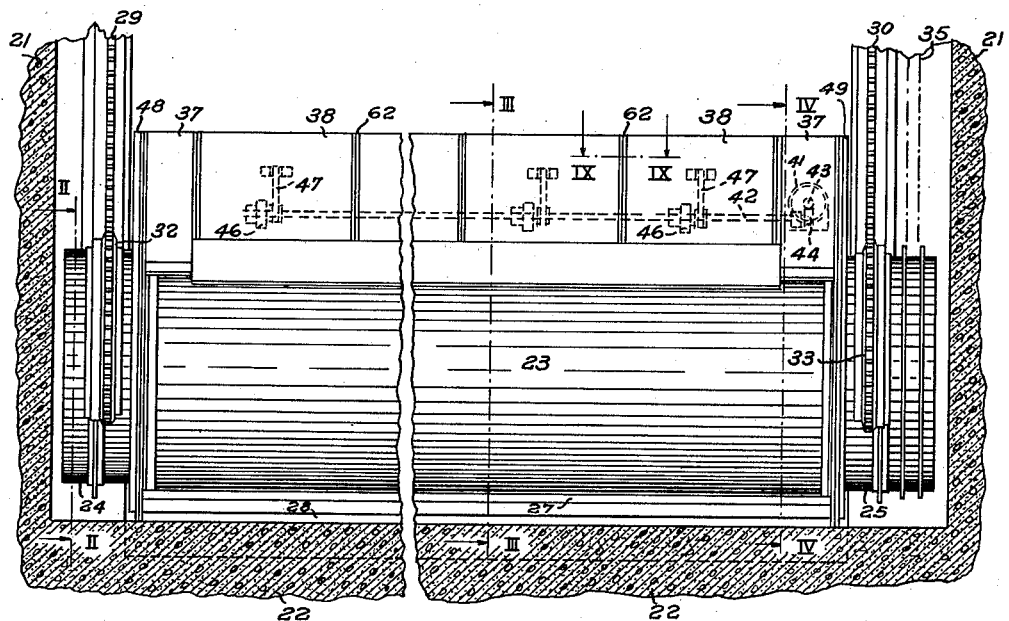
Fig. 1
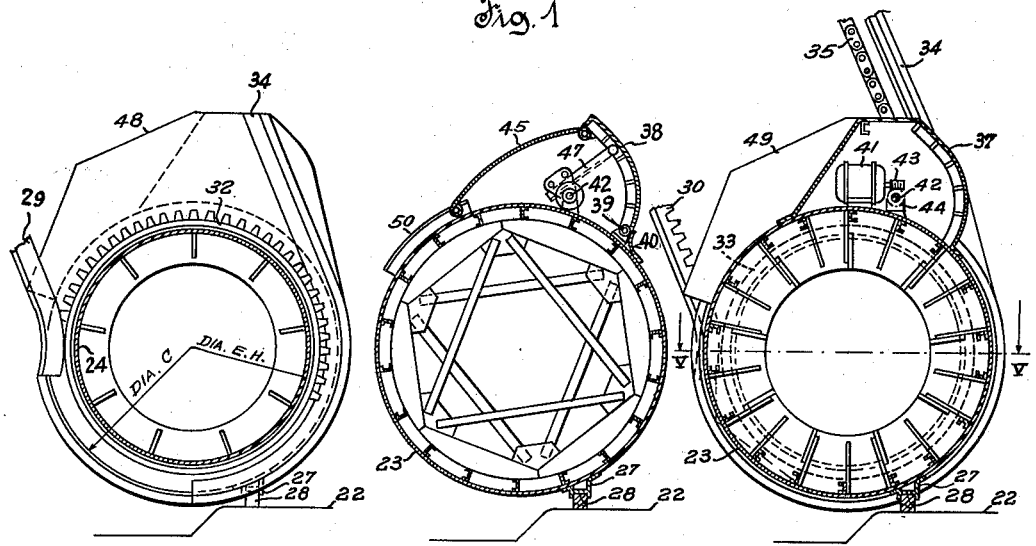
Fig. 2  Fig. 3  Fig. 4
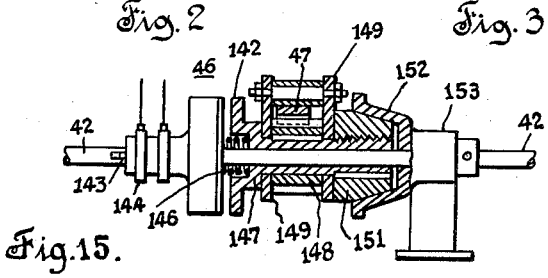
Fig. 15.
Inventor
C. R. Martin
by
Attorney Oct. 4, 1938.   C. R. MARTIN   2,132,307
ROLLER GATE
Filed Jan. 9, 1936   6 Sheets-Sheet 2

Oct. 4, 1938.    C. R. MARTIN    2,132,307
ROLLER GATE
Filed Jan. 9, 1936    6 Sheets-Sheet 3

Oct. 4, 1938.  C. R. MARTIN  2,132,307
ROLLER GATE
Filed Jan. 9, 1936  6 Sheets-Sheet 4

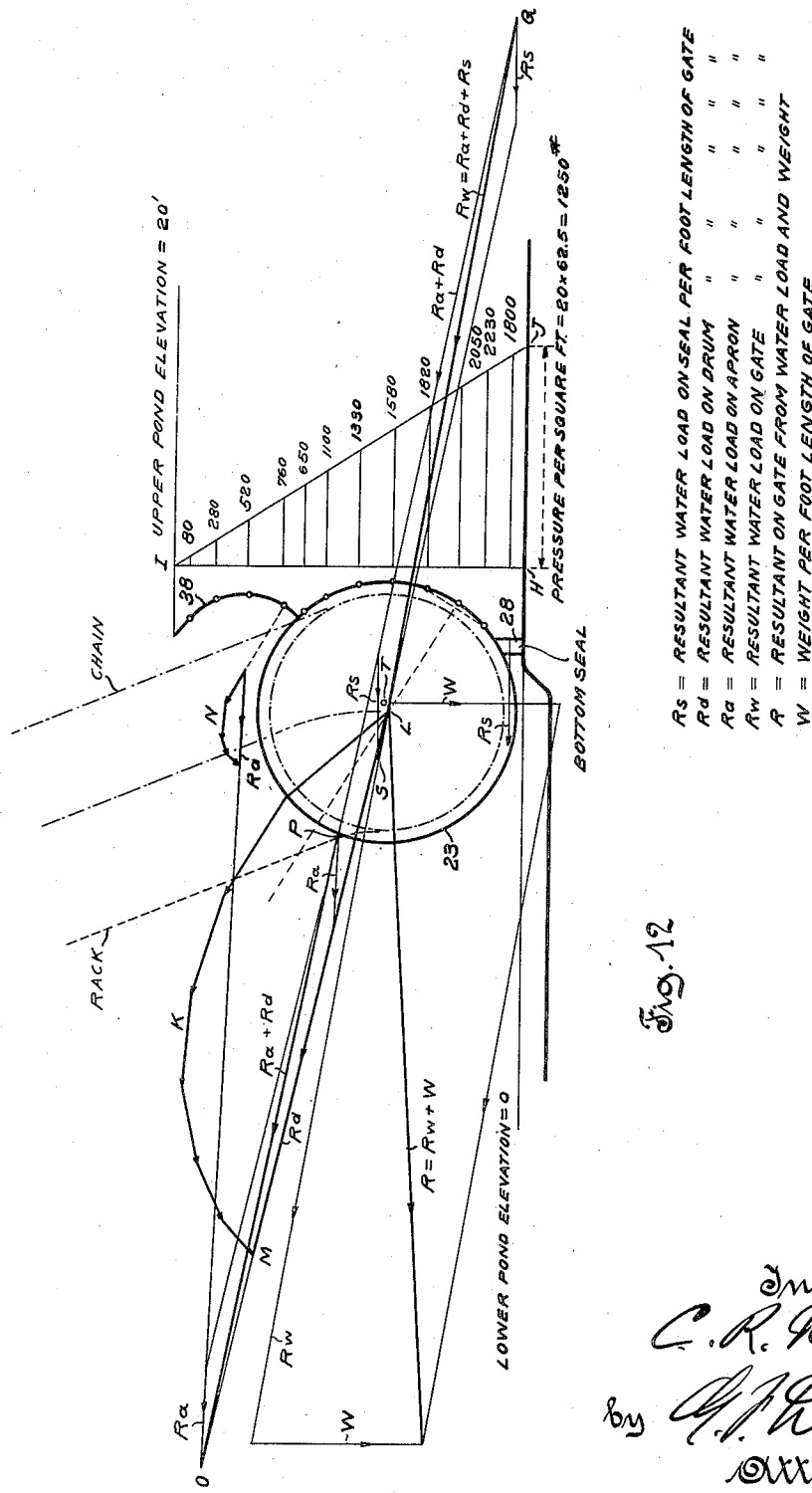

Oct. 4, 1938.   C. R. MARTIN   2,132,307
ROLLER GATE
Filed Jan. 9, 1936   6 Sheets-Sheet 6

Patented Oct. 4, 1938

2,132,307

UNITED STATES PATENT OFFICE 2,132,307

ROLLER GATE

Charles R. Martin, Wauwatosa, Wis., assignor to Allis-Chalmers Manufacturing Company, Milwaukee, Wis., a corporation of Delaware Application January 9, 1936, Serial No. 58,264

28 Claims. (Cl. 61—28)

This invention relates to improvements in movable gates for controlling the flow of streams and particularly to gates of the cylinder or roller type which may be moved as a whole out of the path of flow of the stream to be controlled and which may be adjusted to vary the level of the pool retained by the gate.

Roller gates as supplied heretofore to control the flow of streams, etc., were formed with end heads of substantially the same diameter as the remainder of the structure. Such end heads extend into recesses in piers at each end of the gate and such recesses have to be sealed against entrance of water. Such seals require the use of end shields, larger in area than the cross sectional area of the cylinder itself to provide surfaces extending beyond the edges of the pier recesses, particularly on the upstream side. To secure sufficient flexibility in such end shields to obtain good sealing, the end shields were heretofore necessarily made relatively light and were easily damaged to such extent as to reduce any sealing effect which such shields may have had originally. It has also been usual to provide roller gates with segment shaped extensions called aprons mounted on the bottom of the cylinder when the gate was in the lowermost position, for the purpose of increasing the effective height of the gate with the minimum increase in quantity of required material. When such apron or aprons are used, it is necessary to provide a special sill construction in the concrete floor connecting the bottom of the piers particularly when it is desirable to make the gate adjustable to a position below that normally occupied when the gate is closed. Aprons located at the bottom of the cylinder have to be sufficiently heavy and rigid in construction to support the weight of the entire gate, even when the gate is covered with ice, to withstand the water pressure at the bottom of the pool formed by the gate and to resist the action of debris going downstream. The construction above described requires complicated and massive masonry work to support the weight of the gate and the weight of the various structures employed for operating the gate. Any reduction in the weight of the gate therefore produces not only a direct saving in the cost of the gate itself, but also produces an indirect saving in the cost of the masonry required. Simplification of the masonry required as well as of the gate construction itself is highly desirable not only to reduce the cost of the gate installation, but also to reduce the time required for making such installation. Such simplification also reduces the maintenance required and allows a reduction in the power cost for operating such gate.

It is therefore one of the objects of the present invention to provide a roller gate construction in which the weight of the gate as a whole is reduced by the use of smaller end heads, shields, sills, racks, guard rails and operating structure, thus reducing both the cost of the gate and of the supporting structure.

Another object of the invention is to provide a roller gate construction in which the end heads are reduced in cross sectional area below the cross sectional area of the remainder of the gate, thus permitting the use of pier recesses of less width than the diameter of the cylinder and providing for direct sealing of the upstream edge of the ends of the cylinder on the gate piers with substantial reduction in the size of the usual end shields.

Another object of the invention is to provide a roller gate in which the apron is so constructed and so located on top of the gate, when the gate is in the closed position, as to reduce the weight of the material required therein, to allow adjustment of the upper pool level by adjustment of the apron without lowering of the gate as is necessary with the known type of submergible gate and to permit construction of the apron to perform other functions not heretofore performed thereby.

Another object of the invention is to provide a roller gate construction in which the rack mounted in the recesses in the piers is so shaped that, in combination with an apron located on the top of the gate, the forces acting on the gate tend to close the gate when within the lower positions thereof.

Another object of the invention is to provide a roller gate in which an apron extending from the periphery of the cylinder of the gate is so located on the top of the cylinder as to move away from sheet ice in the pool retained by the gate, when the gate is moved in the direction for opening such gate.

Another object of the invention is to provide a roller gate construction in which an apron is adjustably mounted on the upper side of the gate in such way that the pressure exerted on the apron in the normal position tends to close the gate, when the gate is in the closed position and when adjusted toward the cylinder from the normal position, tends additionally to close the gate; and when adjusted away from the cylinder from the normal position, a neutral position is reached at which the tendency is neither to open nor close the gate; and when further adjusted away from the cylinder beyond the neutral position, the tendency is to open the gate.

Another object of the invention is to provide a roller gate construction in which an apron or projection is formed on the lower part of the gate, when in closed position, and provides a seal for the gate and has pressure surfaces inclined in upstream direction to increase the closing moment acting on the gate.

Another object of the invention is to provide a roller gate construction in which an expansible type of seal may be mounted on one of the parts; the piers or the gate, to seal the joints between these parts and the parts of the gate.

Another object of the invention is to provide a roller gate construction in which a portion of the reinforcement in the concrete forming the piers is used to provide direct supports for the gate structure and to provide a portion of the means for operating the gate.

Objects and advantages, other than those above set forth, will be apparent from the following specification when read in connection with the accompanying drawings, in which:

Fig. 1 is a vertical elevational view, looking downstream, of a roller gate embodying the several features of the present invention and shown in connection with a fragmentary cross sectional view of the pier construction supporting such gate;

Fig. 2 is a vertical sectional view taken on the plane of line II—II in Fig. 1 to illustrate the construction of the end heads of the gate and their relation to the supporting structure located within the recesses in the piers as well as the relation of the diameter of the cylinder to the diameter of the end heads;

Fig. 3 is a vertical sectional view taken on the plane of line III—III in Fig. 1 to illustrate the construction of the cylinder and the apron at any portion of a roller gate intermediate the end sections thereof;

Fig. 4 is a vertical sectional view taken on the plane of line IV—IV in Fig. 1 and illustrating the construction of the end sections of the gate apron immediately adjacent the piers, which apron end sections are stationary relative to the cylinder of the gate and form a housing to receive an operating means for moving the central sections of the apron which are pivotally mounted on the cylinder;

Fig. 12 is a diagram showing the forces acting on the gate when in its closed position, such forces being combined into their resultant to show that, under even the worst conditions, such resultant passes below the point of contact between the stationary and the rotating portions of the gate construction, thus tending to keep the gate in its closed position;

Figure 14:
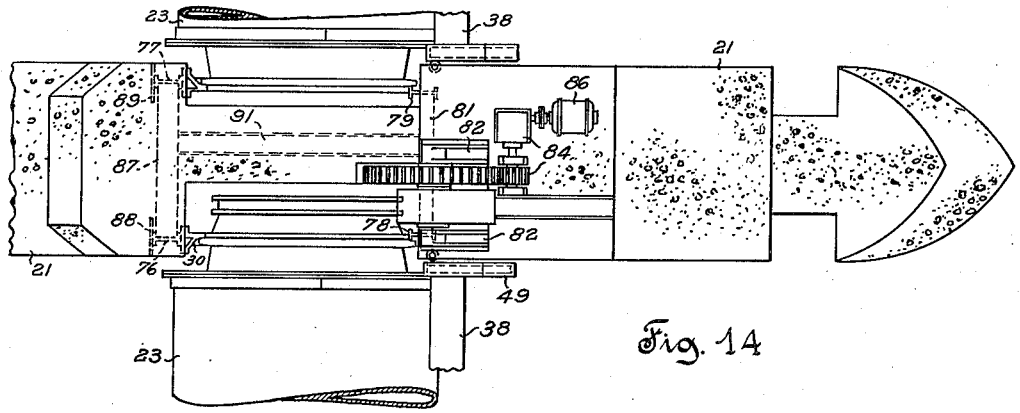
Figure 13:
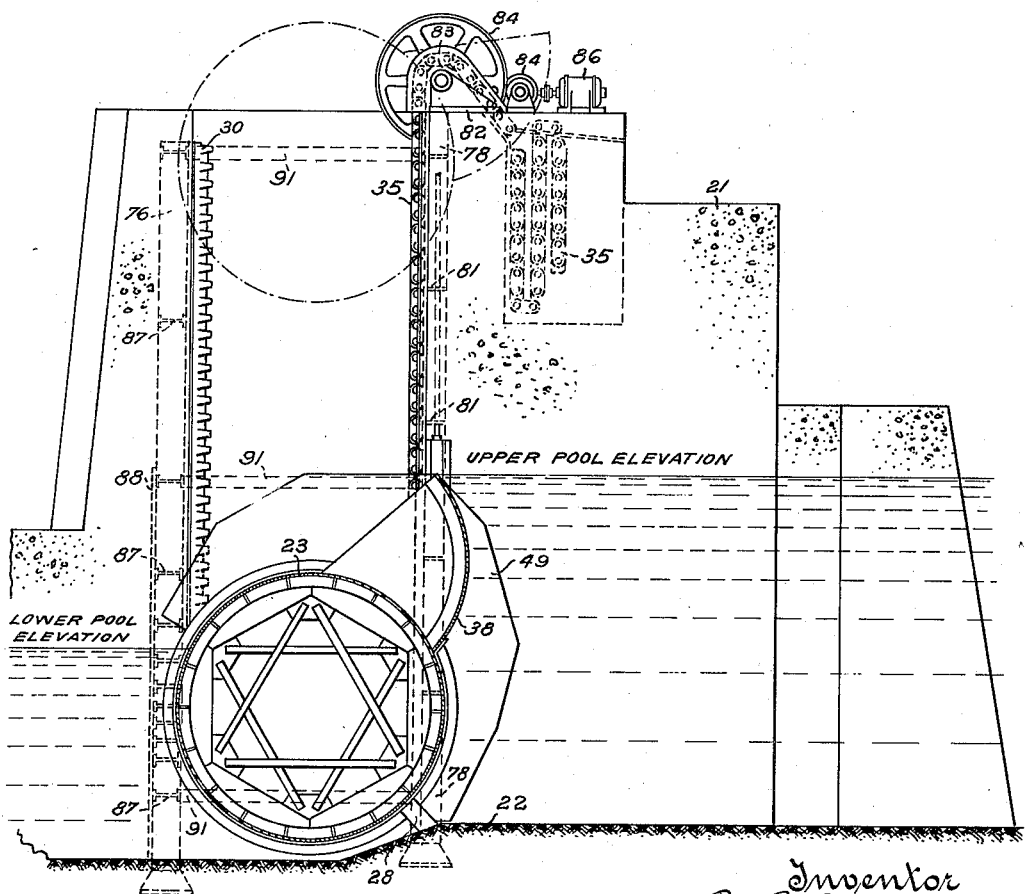
Fig. 13 is a vertical sectional view, partially in elevation, illustrating the construction of the piers and the relation of such piers with the roller gate structure when the piers are adapted for raising the gate in a vertical direction rather than at an angle to the vertical, as is illustrated in the preceding figures.

Fig. 14 is a top plan view of the pier and gate construction shown partially in section and partially in elevation in Fig. 13; and Fig. 15 is an enlarged detail view, partially in section, to illustrate one type of magnetically operable clutch which may be used to secure individual connection of the several movable apron sections to the motor driven operating shaft for selective operation of such sections.

Figure 5:
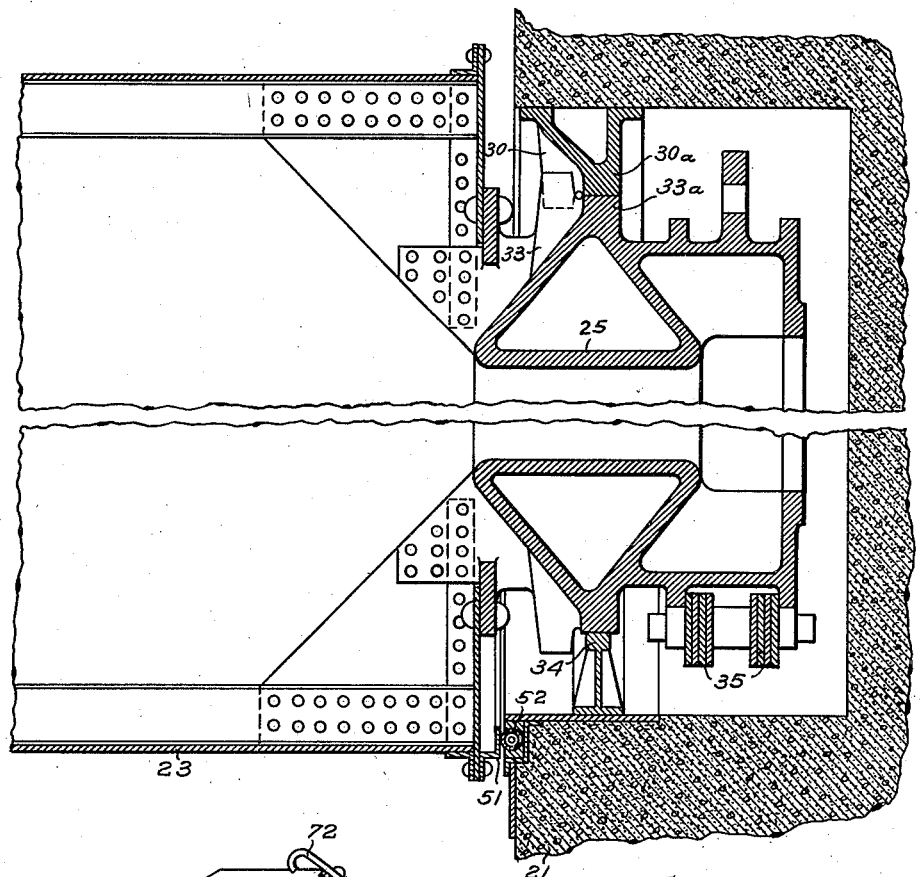
Fig. 5 is a fragmentary vertical sectional view taken on the plane of line V—V in Fig. 4 of one end head of the gate and a portion of the pier construction to illustrate particularly the construction of the end heads of the gate and their relation to other portions of the gate.

Referring more particularly to the drawings by characters of reference, the reference numeral 21 designates the piers of a dam connected by a floor of concrete 22 and defining a spillway through which the flow of water is to be controlled. Discharge of the water through such spillway is controlled by a movable gate which is in the form of a cylinder or roller 23 having end heads 24 and 25 extending into recesses in the piers. The cylinder is provided with a channel iron 27 formed in or attached to the periphery thereof and extending longitudinally thereof along that portion of the cylinder periphery which is adjacent the floor 22 when the gate is in the closed position. The channel iron 27 is adapted to receive and retain a strip of compressible material 28 such as rubber or wood which seats on a sill located in the concrete floor between the piers and provides a seal for the bottom of the cylinder 23, thus preventing excessive leakage of water between the gate and the floor of the pier structure. The piers 21 are severally provided with racks 29 and 30 which racks are fixedly mounted in the pier recesses and extend therein, as shown in Figs. 1 to 6, at an angle to the vertical with the lower end of the racks formed on a slight curve for the purpose of assisting in closing the gate. The racks 30 are provided with portions 30a forming a rail on which the forces acting on the gate are received thus relieving the rack portion 30 of the necessity for being of sufficient size to resist such forces. A guide rail 34 similar to the rack guide rail portion 30a is mounted on the opposite side of the pier recesses to cooperate with the rack guide rail portion in guiding upward movement of the gate. Gear rings 32 and 33 are formed on or attached to the end heads 24 and 25 respectively and engage in the racks 29 and 30 for the purpose of providing a positive means for aiding the upward rolling movement of the gate when such movement is desired. Such upward movement of the gate is guided by rolling of a circular surface formed on the gear rings as shown in Fig. 5 at 33a which surface contacts with the guide rail portion 30a of the racks and with the guide rail 34. Upward movement of the gate is produced by applying tension to one or more lifting chains 35 which are severally wrapped around one or both the end heads 24 and/or 25 and which are preferably in the form of sprocket chains adapted to engage sprocket wheel drives mounted on the piers, as is usual, and is therefore somewhat diagrammatically shown only in Figs. 13 and 14.

An extension from the periphery of the cylinder, hereinafter designated the apron, is mounted longitudinally along the periphery of the cylinder at the portion thereof which is adjacent or substantially in the uppermost position when the gate is in the closed position. The apron may be made as a single fixed unit or preferably as a single movable unit, but may be divided into sections such as the two sections 37 which are fixedly mounted on the ends of the cylinder 23 and form water tight enclosures for the purposes of receiving operating means for a plurality of sections as shown at 38 which are pivotally mounted at 39 on the cylinder and are arranged between the immovable end sections 37 in water tight relation therewith. The joints between the cylinder 23 and the pivotal apron sections 38 are closed against the leakage of water therethrough by flaps 40 preferably of some resilient and compressible material such as rubber mounted on the cylinder and pressed into contact with the cylinder and the apron by the water pressure acting on the gate. One of the end sections 37 is arranged to receive an electric motor 41 or other suitable power driven operating means connected to drive a shaft 42 through suitable transmission means, such as a worm 43 mounted on the motor shaft and a worm wheel 44 mounted on the driven shaft 42. The shaft 42 extends throughout the length of the gate and is connectable and separable by means of suitable remotely controllable clutches such as the magnetic clutches indicated at 46, to the operating means for the movable apron sections. Each one of the sections 38 of the apron is severally connectable by a suitable drve, such as the rack and pinion connection shown at 47, through shaft 42 and the clutches 46. Upon operation of the motor 41 and of the clutches 46, any one or all of the movable apron sections 38 may be lowered or raised thus allowing adjustment of the level of the pool formed by the gate without movement of the entire gate structure.

The clutch generally designated by 46 is of the type disclosed in U. S. Patent 1,479,034 issued January 1, 1924, to B. E. Fernow in which a magnetic clutch and a friction brake are so combined as to secure release of the brake upon engagement of the clutch and to secure engagement of the brake upon disengagement of the clutch. The clutch 46 comprises a driving member 141 and a driven member 142, the driving member being held on shaft 42 by splines 143 which permit movement of such driving member axially of the shaft and require rotation thereof with the shaft while the driven member is not moved by the shaft when the clutch faces are not engaged. The driven member 141 is provided with a winding supplied with electric current through slip rings and brushes 144 as is usual to provide suitable magnetization of the driving member and consequent attraction of the driven or armature member 142. The armature member 142 is normally held out of engagement with the magnet member 141 by a spring 146 which is free to rotate relative to either of the clutch members. The driven or armature member comprises a hub and a sleeve portion 147 mounted free on the shaft 42. A ring gear 148 is keyed on the sleeve 147 of the driven member 142 and is enclosed in a pair of disks 149 which are connected to each other to form a guide for the rack 47. Outside of the rack guide 149 is mounted a conical friction brake member 151 which is engageable in a similar conical friction brake member 152 formed as a portion of the pedestal bearing 153 which supports the shaft 42. When an apron section is to be moved relative to the cylinder, magnet clutch member 141 is energized as is well known to attract armature member 42, thus disengaging brake members 151 and 152 and providing for movement of the gear 148 and the rack 47 upon movement of the shaft 42. When the apron section has reached its predetermined position, supply of electric current to the magnet clutch member 141 is interrupted and the spring 146 reexpands to separate the magnet clutch member 141 and the armature clutch member 142 and to reengage the friction brake members 151 and 152 which then retain the apron section in position.

The shaft 42, clutches 46, rack and pinion drives 47 as well as the downstream portion of the periphery of the cylinder 23 are preferably protected from the impact of ice or debris going downstream over the apron, by a cover member 45 which extends from the upper edge of the apron to a portion of the periphery of the cylinder at approximately the level of the water downstream of the gate. Such cover 45, when associated with a movable apron as shown in Fig. 3 is preferably hinged to the upper edge of the apron and is provided with pins at the lower edge of the cover to slide in slots in guide plates 50 secured to the periphery of the cylinder and extending for such distance as the cover pins are required to move when the apron is lowered. The cover is preferably so shaped as to lie substantially flat on the periphery of the cylinder when the apron is in its lowered position.

The end heads 24 and 25 are preferably made as integrally cast members, as shown in Fig. 5, which are considerably smaller in diameter than the diameter of the cylinder portion 23 as indicated in Fig. 2. Such end heads then leave a considerable portion of the ends of the cylinder 23 free and, being smaller than the cylinder end, the end of the cylinder is greater in diameter than the width of the pier recesses into which the end heads extend. End shields 48 and 49 are preferably attached to only the upper portions of the cylinder and form one wall of the fixed apron sections 37. Such end shields, as shown particularly in Fig. 4, preferably extend upstream and downstream of the apron only a sufficient distance to enclose the pier recesses in cooperation with the ends of the cylinder 23, for the purpose of sealing the pier recesses against the free flow of water thereinto.

Figure 8:
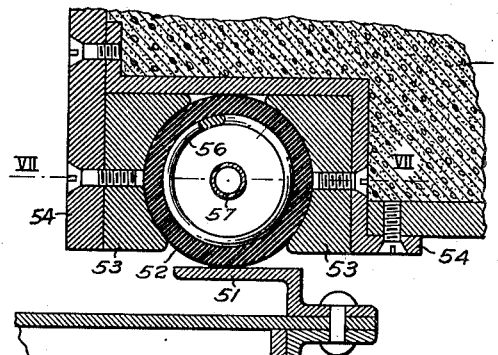
Fig. 8 is a horizontal sectional view taken on the plane VIII—VIII of Fig. 7 to aid in illustrating the construction of the sealing means employed.
Figure 7:
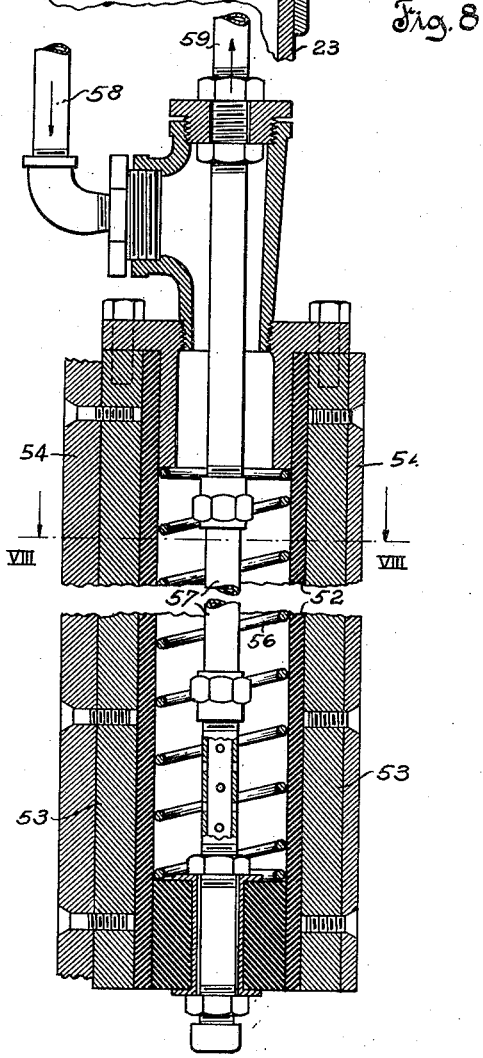
Fig. 7 is a vertical sectional view of the sealing means, taken on the plane VII—VII of Fig. 8, employed to seal the ends of the gate against the piers.
Figure 6:
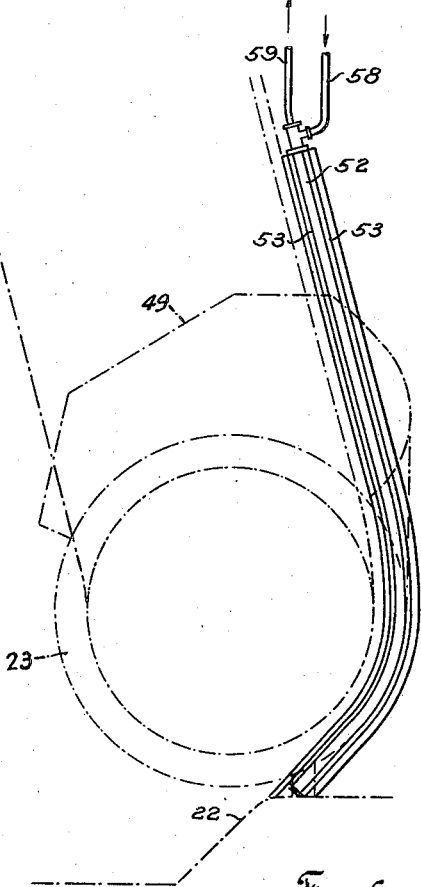
Fig. 6 is a diagrammatic view showing the location of the sealing means on the pier adjacent the edge of the pier recesses on the upstream side thereof and the relation of such means to the end heads of the cylinder, and of the reduced end shields of the gate.

A sealing member can now be mounted directly on the piers as shown in Figs. 5, 6 and 8 in such relation to the ends of the cylinder 23 that a flanged member 51 about a portion of such ends will contact with said sealing member, thus eliminating the need for the use of an end shield projecting beyond the periphery of the cylinder excepting for that portion of the gate which is not sealed by direct contact of the ends of the cylinder with such seal. The sealing means comprise an expansible tube 52 set into two opposed rows of concave sided blocks or strips 53 seating in a seat formed by members 54 set into the pier and retained in such seat by screws or other suitable fastening means. The rows of blocks 53 do not contact with each other, thus leaving an opening through which the tube 52 may be expanded as much as desired, within limits as will be explained, to secure adequate sealing contact thereof with the flange 51. Tube 52 is prevented from collapsing when deflated and from pulling out of blocks 53 when inflated to an excessive extent, by a helical spirng 56 fitting closely within the tube in its normal unexpanded condition. A second tube 57 extends entirely through the tube 52 and is provided with apertures at the lower end thereof, see Fig. 7, to cooperate with the tube 52 in providing a concentric path for the supply of an inflating medium to the sealing tube 52 and for the discharge of such medium from the tube 52 by way of the inner tube 57. When it is desired to secure a sealing action at the upstream edge of the cylinder, air or other inflating medium is delivered to the tube 52 by way of conduit 58 from a suitable source and under control of suitable means. The air or other inflating medium, which may be heated or otherwise treated before admission to the tube 52, then passes into the tube 57 and returns to the source by way of a conduit 59. It will be observed that the seal also contacts with the upstream portion of the end shields 48 and 49, as shown in Fig. 6, forming a portion of the closed end apron sections 37.

Figure 9:
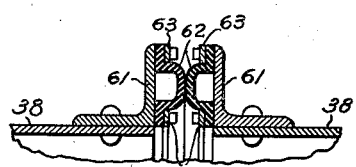
Fig. 9 is a partial horizontal sectional view taken on the plane IX—IX of Fig. 1 to illustrate the type of sealing means employed in sealing the joints between the various sections of the apron when such apron is made in sections.

The several apron sections 37 and 38 are each provided with flanges 61, see Fig. 9, on which are mounted resilient substantially U-shaped members 62 extending into slightly compressed contact with each other as by the supply to such members of compressed air brought in through the cylinder trunnions, and such members are clamped in such contact with each other by retaining strips 63 and 64 secured to the flanges 61. It will be understood that any other suitable type of seal may be employed to seal the joints between the gate and the piers as well as the joints between the several apron sections, although the seals shown have been found satisfactory in hydraulic practice.

Figure 10:
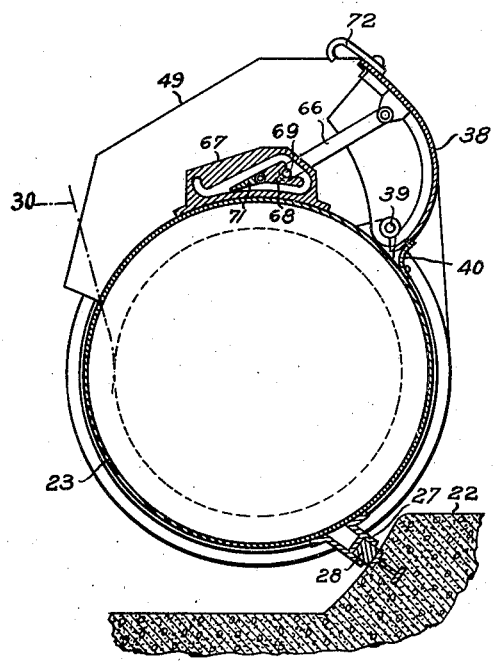
Fig. 10 is a cross sectional view of a gate with a movable apron to illustrate one form of latch by which the apron may be held in position when the apron is raised by means external to the gate.

Under some conditions it may be unnecessary or even undesirable to provide the gate with a motor 41 for adjusting the positions of the apron sections 38. As shown in Fig. 10, such motor is not required if a crane is present which is so located or so movable as to be available for use with each gate and if the several apron sections 38 are provided with a pivotally mounted link 66 having a pin portion engaging with a latch mounted on the cylinder 23. The latch comprises a block or plate 67 in which are cut grooves about a central boss 68 formed with a notch 69 and provided with a pivotal guiding portion 71. When it is desired to lower an apron section 38 from the position shown, assuming that the structure shown in Fig. 10 is used, a crane or other suitable lifting means is attached to the hook 72 formed on each of the movable apron sections and the apron section is pulled in upstream direction. The latch pin connected to the member 66 then pulls out of the notch 69 and drops into the groove below the latch boss 68. The apron section is then allowed to drop down, the latch pin moving in downstream direction in the lower groove in the latch block under the pivoted guide 71 to the curved end of the block groove whereupon the apron section will be in its lowermost position. When it is required to raise the apron section, lifting means are connected to the hook 72 and a lifting force is applied which causes the latch pin to slide in upstream direction in the latch groove over the pivoted guide 71 and through the upper groove until the latch pin again engages notch 69 whereupon the hook 72 may be released and the apron section will be retained in its raised position. It will be understood that a number of notches 69 may be provided at different levels in the central boss 68 of the latch thus allowing adjustment of the apron or apron sections to various positions.

Figure 11:
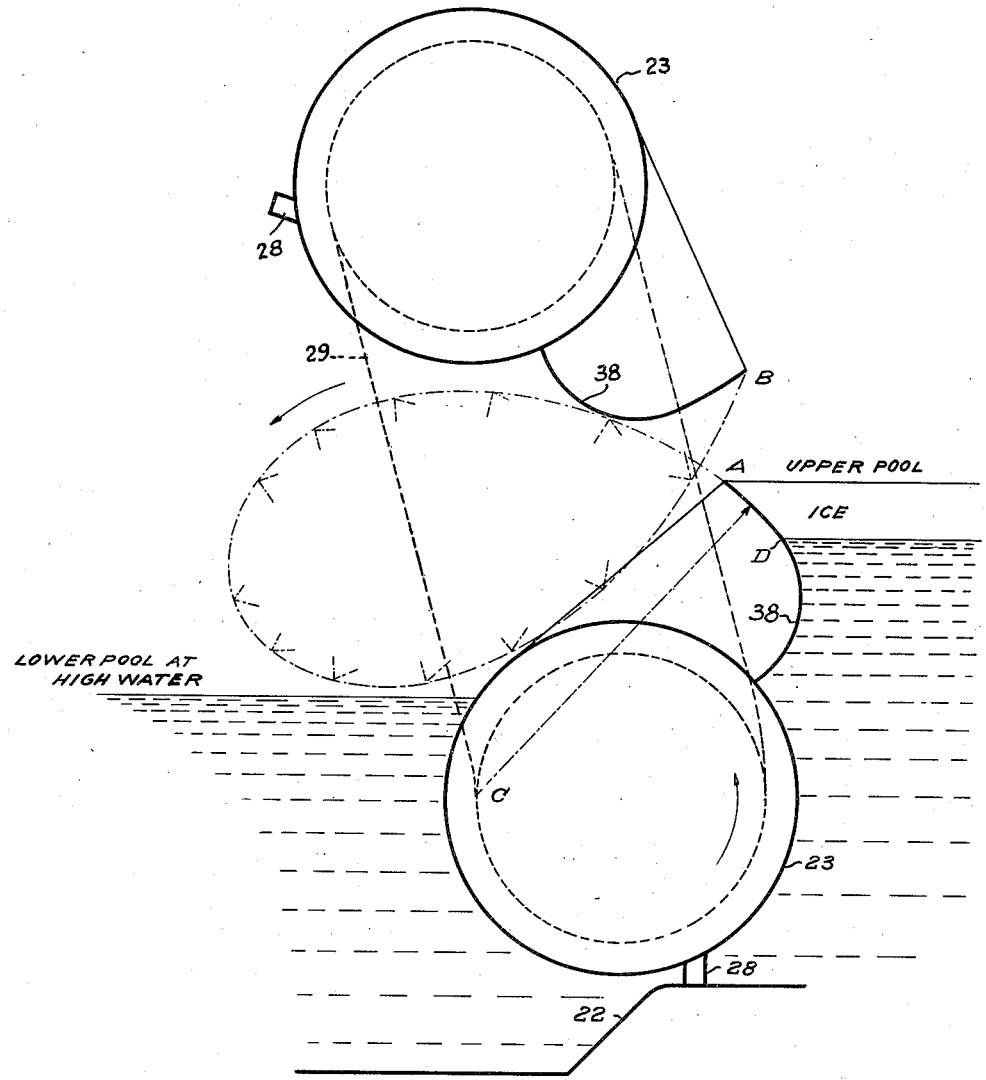
Fig. 11 is a diagrammatic illustration of the manner in which the gate structure frees itself from any ice sheet on both the upper and lower pools and showing the path of movement of the apron and of the cylinder in dotted lines.

The diagram shown in Figure 11 illustrates the path of movement of the gate when such gate is raised with a fixed apron or with a movable apron in its extended position. The apron is preferably so formed that the water contacting surface is divided into an edge portion extending from the upper edge of the apron to the point D thereof and an inner portion extending from the point D to the point of connection of the apron with the cylinder, the edge and inner portions of the apron preferably being of differing curvature for the purpose of keeping all points thereof within the path of the edge. The path of movement of the apron is shown by the intersecting curved dot and dash line AB which is obtained by plotting the path of the point A on the upper edge of the apron from the time the gate begins to pivot about the point C on the rack 29 until the upper edge of the apron has reached the point B at the time the gate has been lifted to its uppermost position. The path of upward movement of the cylinder itself is shown by the dotted parallel lines indicating the surfaces of the rack 29 and the guide rail 34. It will be seen that the torque required to break the apron away from the ice on the upper pool is applied in shear rather than in flexure and that such a force is accordingly very much reduced from the amount required by the present known gate construction. The cylinder path is downstream of the edge of the upper pool ice and within the projection of the path of movement of the apron and there is therefore no requirement for further force to lift both the cylinder and a sheet of ice and to break the ice as is the case in present day constructions. The curvature of the apron is such that the inner portion moves within the path of travel of the edge portion thereof as shown. The apron as a whole is so located on the cylinder as to be upstream of the edge of the pier recesses and the edge portion thereof is so shaped as to be substantially within an arc having a radius extending from the point of contact C of the closed gate with the rack to approximately the point of contact of the water surface on the apron. Expressed differently, the edge portion, at least, of the apron is so shaped that a perpendicular drawn to a tangent at any point on the upper surface of the apron, passes through or near the point of contact C between the rack and the gate when the gate is in the closed position. An approximation to the differing curvature of the edge and inner portions of the apron, may be considered adequate and may be secured by shaping the apron on an arc approximating the differing curvatures.

Heretofore, especially in the absence of freezing conditions, it was considered impossible to place the apron only at the top of the cylinder, due to the belief that the total pressure load of the gate would be such as to tend to lift the gate rather than to retain the gate in its closed position. A load diagram is therefore shown in Fig. 12 in which the most unfavorable condition of the forces, namely, full hydraulic head without any back pressure whatever, has been assumed. Because the total vertical height of the entire gate is usually twenty feet, such value has been assumed. The forces acting on the cylinder have been calculated in pounds of pressure per square foot and are represented as a whole by the force triangle designated HIJ. To obtain the resultant of all the forces, the forces are considered as being divided into first, forces acting against the bottom projection formed by the channel iron 27 and the seal 28 used when freezing conditions are present; second, forces acting perpendicular to the periphery of the cylinder 23 itself; and third, forces acting perpendicular to the upstream surface of the apron 37, 38. The bottom projection or seal being a plane surface perpendicular to the direction in which the pressure acts, the forces acting thereon are obtainable by direct calculation and require no vectorial analysis. The forces acting perpendicular to the cylinder are taken at the various points indicated by small circles on the periphery of the cylinder and are vectorially added as shown at K to obtain the resultant R$d$ of all the forces acting on the cylinder, such resultant having the direction and value from the center L of the cylinder 23 to the point M. The forces acting perpendicular to the apron are taken at the points indicated by small circles and are vectorially added as shown at N to obtain the resultant R$a$ of the direction and value shown. R$a$ and R$d$ are then extended to their intersection O and a parallelogram is formed having the direction and values of R$a$ and R$d$ as two of its sides. The diagonal R$a$ plus R$d$ of such parallelogram is the summation of the forces acting on both the cylinder and the apron and such resultant extends from the point O to the point P. The resultant R$a$ plus R$d$ is then extended to meet the forces R$s$ at the point Q, the force R$s$ being the force acting on the bottom seal of the cylinder. A parallelogram is formed having the direction and values of R$a$ plus R$d$ and of R$s$ for two of its sides. The diagonal R$w$ of such parallelogram extends from Q to S and is the resultant of all forces acting on the cylinder excepting the weight thereof. R$w$ is then taken from the intersection with the force W which is the weight of the gate and a parallelogram is constructed using R$w$ and W as the two sides thereof. The diagonal R of such parallelogram then gives the direction and total value of all of the forces acting on the gate. It will be observed that such resultant R passes below the center of gravity T of the gate and that the resultant is directed downwardly thus assuring that the forces acting on the gate, even under the unfavorable conditions which have been assumed, are so directed and of such magnitude as to overcome the buoyancy of the gate and that the gate therefore will remain closed unless positively opened by the application of a lifting force thereto. Under more unfavorable conditions as where a gate closing moment is desirable, the channel iron 27 and the seal 28 may be inclined upstream as shown in Figs. 10 and 13. The inclination of the pressure surface of such a seal provides both a wider surface and a longer radius of action thus increasing the closing moment on the gate, especially when the surface extends radially to provide the maximum moment arm.

A gate and pier construction is shown in Figs. 13 and 14 in which the pier is so constructed as to provide for raising, in a purely vertical direction, of a gate of the structure heretofore described. The construction of the gate itself and of the means for sealing the gate to the pier as well as the means for raising such gate is as previously described except for the extent and shape of the end shields 49 and accordingly need not be repeated. The pier, however, is preferably provided, when it is desired to provide for vertical lifting of the gate, with reinforcements to distribute the stresses transmitted thereto from the gate when the gate is in either the open or closed position. Such reinforcements preferably comprise columns 76, 77, 78 and 79 set into the concrete of the piers adjacent the exterior corners of the two recesses in each pier. The stresses on columns 78 and 79 on the upstream side of the pier recesses are not of the same magnitude as the stresses on the columns 76 and 77 on the downstream side of the pier recesses and the upstream columns can accordingly be made relatively lighter than the downstream columns. The columns 78 and 79 are preferably joined at intervals along their lengths by cross bars or plates 81 to aid in securing distribution of the stresses throughout the concrete and to retain the columns in the proper relation to support a bed plate 82 on which are mounted a sprocket 83 for the chain 35, the gear train, herein collectively designated by 84, and the motor 86 for raising the gate. The columns 76 and 77 are required to transmit relatively high stresses to the pier concrete on the downstream side of the gate and are accordingly made of a larger size than the upstream column 78 and 79 and are joined by a large number of cross bars or cross beams 87 which are preferably arranged at irregular intervals along the columns 76 and 77 dependent on the magnitude of the stresses to be transmitted to the pier concrete. Better distribution of the stresses throughout the pier concrete is obtained if plates 88 and 89, of greater width than the columns 76 and 77, are placed back of such columns respectively, in order that the stresses may be distributed over a greater area of concrete than is possible by the use of the columns alone. The several columns are preferably so arranged as to provide supports for the racks 29 and 30, for the guide or riding rails and other portions of the gate structure within the pier recess. The several pairs of columns may, of course, be connected by cross members 91 extending through the pier concrete to form a substantially H shaped frame or may be otherwise connected to form a unitary frame.

Due to the vertical lift of the gate, the length of the pier can be very much decreased from the length of the present construction, particularly on the portion downstream of the gate, thus largely reducing the amount of the pier foundation piling required and of the floor required between the several piers. Such reductions all contribute to a very material saving in the materials and the time required for the construction of each individual pier. Due to the unitary frame described above, the vertical lifting of the gate also permits distribution of the stresses between the pier portions upstream and downstream of the gate rather than allowing concentration of such stresses in the downstream pier portion only as is now the case with oblique lifting of the gate. The arrangement of the vertical columns with the horizontal beams interconnecting such vertical columns, provides a frame resting directly on the pier foundations which frame may then be used as a point of anchorage for the pier forms thus keeping such forms in perfect alinement during construction of the pier. Such frame provides for distribution of the stresses throughout the entire mass of the concrete not only of the pier but also of the pier foundations thus avoiding the necessity of excessive reinforcement in the concrete and particularly in the concrete adjacent the pier recesses as is the present practice.

It is to be particularly noted that the pressure relationships as shown in Fig. 12 are changed, in the constructions shown in Figs. 13 and 14, in degree only due to the vertical lift of the gate and are particularly changed in degree only in direction and in magnitude as long as a gate, as herein disclosed, with a top apron and a bottom member is used. It will be seen in Fig. 13 that the bottom projection and seal member is somewhat larger than previously shown and that such member extends from the cylinder at an angle in the upstream direction for the purpose of securing the exact magnitude of the force Rs required and the proper direction of such force to increase the closing moment acting on the gate. The gate itself then may be made of lighter materials and the size and direction of the bottom projection may be varied as desired.

Those skilled in the art will recognize that the use of end heads of a size smaller than the diameter of the cylinder itself permits the use of a cast, compact, unitary end head member rather than a built up plate structure requiring a large number of parts, thus providing a better mechanical design at a lower cost. The pier structure may be made smaller and simpler in shape, thus materially reducing the cost of the piers. The ends of the cylinder may be sealed directly to the piers so that the end shields as well as the pier mounted seal parts may be very largely reduced in size, thus largely reducing costly portions of the gate structure and greatly reducing the weight, and hence the cost, of the gate. Such direct sealing of the cylinder to the piers also simplifies the application of sealing means and permits the use of any well known seal common to hydraulic practice. The great reduction in the lifting force required and the simplification of structure obtained permits the angle of inclination of the racks to be reduced or even permits the racks to be made vertical, thus allowing reduction in the length of the means supporting the hoisting mechanism, and accordingly permitting the width of the pier in the direction of the stream flow, to be very much reduced.

The racks 29 and 30 are curved in downstream direction at the bottom portions thereof to cooperate particularly with the top apron in providing a pivot for acting on the gate. Such pivot then provides a point by which it may be determined that the closing moment on the gate is sufficient and yet not so excessive as to place too heavy a load on the chain. The ideal condition is to so design the gate that the resultant of forces passes below but closely adjacent the curved portion of the rack in contact with the gate when in closed position, thus securing as nearly a self-balancing gate as is possible. Further downstream curvature of the rack beyond the point of contact with the gate, is of course, required when a submergible type of gate is employed but is not required for a non-submergible gate.

Location of the apron on the top of the cylinder allows access to the apron at all times and allows the apron to be made much lighter than when such apron must resist the pressure and weight when placed at the bottom of the cylinder. Such location of the apron also avoids the collection of trash due to backwash behind and within the apron, which trash collection was heretofore believed to be an unavoidable disadvantage of the roller type of gate. Due especially to the location and curvature of the apron, the apron readily breaks away from any ice in the upper pool, thus avoiding the requirement of sufficient strength in the apron to carry and to lift a load of ice and also greatly reducing the power required to free the apron from the ice. Placing the apron on top of the cylinder has the further advantage that the center of hydraulic pressure is substantially at the center line of the cylinder and therefore at the line of greatest strength, thus permitting the cylinder itself to be made of lighter material with less bracing internally thereof than was the case with former designs with bottom aprons in which the center of pressure was directed against the apron itself. No curved bottom sills located in the concrete floor are necessarily required when an adjustable top apron is used, with the consequent reduction in cost. The top apron still retains the advantage of control of water level in the upper pool without movement of the entire gate. There is therefore a further great reduction, by eliminating the curved bottom sill, in the amount of excavation required and in the amount of concrete required, thus further reducing the cost of a roller gate installation. When the apron is pivotally mounted on the top of the cylinder, the operation of the gate can be facilitated by operation of the apron provided the moments acting on the gate are unfavorable to the desired operation thereof. Thus, when the apron is folded down on the cylinder, the closing moments on the gate will be at the maximum and, when the apron is extended as far upstream as possible, the opening moments of the gate are at the maximum. A position intermediate the two extreme positions above mentioned can be reached at which the moments on the gate will be neutral, that is, not aiding in either opening or closing of the gate. Making the top apron sectional allows the very ready control of the flow over the gate through channels of known dimensions, thus allowing exact calculation of the rate of water discharged.

If a seal of the type shown is used for sealing the ends of the cylinder and the pier, it will be apparent that such seal does not require any adjustment but can be inflated to secure any degree of water tightness required. Such seal can be readily freed or kept free from ice by the application of a heated inflating medium thereto, thus avoiding the cost and complication in construction when electric heaters are applied to the end shields as was done heretofore to keep the gate free from ice, as well as avoiding the continuous cost of operation of such heaters.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a gate for controlling the flow of water, a plurality of piers defining a spillway and having recesses therein, a cylinder extending across the spillway, and separate end heads primarily supported by and extending from the ends of said cylinder into the recesses in said piers, the diameter of said cylinder being greater than the width of the recesses in said piers.

2. In a gate for controlling the flow of water therethrough, a plurality of piers defining a spillway and having recesses therein, a cylinder extending across the spillway and into proximity with said piers, separate end heads secured on said cylinder and extending into the recesses in said piers, the diameter of said cylinder being greater than the width of the recesses in said piers, and seals located on said piers between said cylinder and said piers for directly sealing the joints therebetween.

3. In a gate for controlling the flow of water therethrough, a plurality of piers defining a spillway and having recesses therein, a cylinder extending across the spillway and into proximity with said piers, separate end heads on said cylinder and extending into the recesses in said piers, the diameter of said cylinder being greater than the width of the recesses in said piers, and a seal located on each of said piers upstream of said cylinder for direct engagement with portions of the ends of said cylinder.

4. In a gate for controlling the flow of water therethrough, a plurality of piers defining a spillway; a cylinder extending across the spillway and into proximity with said piers; and a seal located on said piers between the ends of said cylinder and said piers and comprising an expansible tube, and means extending into and connected with said tube to provide channels for the flow of a fluid thereto and therefrom.

5. In a gate for controlling the flow of water therethrough, a plurality of piers defining a spillway; a cylinder extending across the spillway and into proximity to said piers; and a seal located on said piers between the ends of said piers and said cylinder and comprising a resilient tube, means extending into and connected with said tube and cooperating therewith to provide separate channels for the flow of a fluid from and to said tube, and means partially enclosing said tube for limiting the degree of distortion thereof.

6. In a gate for controlling the flow of water, a cylinder, an apron located on the top portion of the periphery of said cylinder with reference to the gate in closed position and extending upstream therefrom into tangency to a plane substantially vertically tangent to the periphery of said cylinder on the upstream side thereof and located entirely upstream of a vertical plane passing through the axis of said cylinder.

7. A gate for controlling the flow of water, a rack, a cylinder having a circular surface rollable on said rack, means for maintaining said cylinder in horizontal position and an apron mounted along the top of said cylinder with reference to the gate in closed position and having an arcuate edge portion, the radius of the edge portion extending from the point of contact of said circular rolling surface with said rack to the uppermost point of contact of water with the apron, whereby said edge portion initially moves downstream away from impeding material resulting from the closed position of the gate.

8. In a gate for controlling the flow of water, a cylinder, an apron mounted along the top of said cylinder and having a portion thereof located upstream of said cylinder when in closed position, and a cover member extending from the upper edge of said apron to the periphery of said cylinder on the downstream side thereof.

9. In a gate for controlling the flow of water, a cylinder, an apron pivotally mounted along the periphery of said cylinder at an upper portion thereof, means for moving said apron about the connection thereof with said cylinder, and a cover member pivotally associated with the upper edge of said apron and slidably connected with said cylinder at its periphery downstream from said apron.

10. In a gate for controlling the flow of water, a cylinder, and an apron mounted longitudinally on the upper periphery of said cylinder and extending the entire length thereof, said apron being divided into a plurality of sections, one of the sections being fixed relative to said cylinder and one of the sections being pivotally connected with and movable relative to said cylinder.

11. In a gate for controlling the flow of water, a cylinder, a sectional apron having a fixed section and a section movably mounted along the periphery of said cylinder, means for moving the movable section of said apron about the mounting thereof on said cylinder, and means for retaining the movable section in predetermined position.

12. In a gate for controlling the flow of water, a cylinder, a sectional apron having fixed sections and sections pivotally mounted along the periphery of said cylinder at an upper portion thereof, and latch means movably mounted on each of the pivotal sections of said apron and movable into engagement with said cylinder for retaining the sections severally in raised position.

13. In a gate for controlling the flow of water, a cylinder, an apron movably mounted on the periphery of said cylinder at an upper portion of said cylinder, said apron being divided into a plurality of sections immovable relative to said cylinder and a plurality of sections pivotally mounted on said cylinder, operating means for connection with each of said pivotally mounted sections for moving the same relative to said cylinder, and means mounted cooperatively on said cylinder and on each of the said pivotally mounted sections for selectively connecting said sections with said operating means.

14. In a gate for controlling the flow of water, a cylinder, an apron movably mounted along the periphery of said cylinder at an upper portion thereof, said apron comprising a section fixedly mounted on said cylinder and providing an enclosed compartment and a section pivotally mounted on said cylinder and movable into engagement with the fixed section, and operating means mounted within the fixed section and extending therefrom for connection with the pivotal section.

15. In a gate for controlling the flow of water, a cylinder, an apron movably mounted along the periphery of said cylinder at an upper portion thereof, said apron being divided into a plurality of sections fixedly mounted on the ends of said cylinder and a section pivotally mounted between such end sections, and end shields on the ends of said cylinder to cooperate with the fixed sections of said apron in forming closed compartments and in reducing leakage around the gate.

16. In a structure for controlling the flow of water, a cylinder, an apron mounted on said cylinder on the upper portion thereof, said cylinder and said apron having the water pressure acting thereon and producing a force tending to cause movement thereof, and a plane surfaced projection extending from the lower portion of said cylinder and adapted to substantially balance the force acting on said cylinder and said apron, both said apron and said projection being located upstream of a vertical plane passing through the axis of said cylinder.

17. In a structure for controlling the flow of water, a cylinder, an arcuate surfaced apron mounted on the upper portion of said cylinder, the water pressure acting on the surfaces of said cylinder and said apron tending to cause movement thereof, and a plane surfaced portion projecting perpendicular from a tangent to the surface of said cylinder and of an area to substantially balance the force acting on said cylinder and said apron, both said apron and said projection being located upstream of a vertical plane passing through the axis of said cylinder.

18. In a gate for controlling the flow of water, a plurality of piers defining a spillway and having recesses therein on each side of the spillway, a frame imbedded within said piers and comprising a plurality of column members supported from a foundation and a plurality of members interconnecting the column members, said frame having exposed portions on each side of the recesses in said piers, movable water flow controlling means supported upon and guided in its movements by the exposed portions of said frame and plates mounted on the column members on the downstream side of said frame and extending from the foundation to substantially the height of the upper edge of said water flow controlling means to distribute the load stresses thereon throughout said piers.

19. In a gate for controlling the flow of water, a plurality of piers defining a spillway and having recesses therein on each side of the spillway, a frame comprising a plurality of vertical members supported from a foundation and a plurality of substantially horizontal members interconnecting the vertical members, said frame having exposed portions on each side of the recesses in said piers, movable water flow controlling means supported upon and guided in its movements by the exposed portions of said frame, a platform supported directly by said frame and extending above said piers, and means mounted on said platform for moving said flow controlling means into and out of flow controlling positions in the channel.

20. In a gate for controlling the flow of water therethrough, a plurality of piers defining a spillway; a cylinder extending across the spillway and in proximity to said piers; and a seal located on said piers adjacent the ends of said cylinder comprising a resilient tube, means extending into said tube and having an inlet adjacent the bottom of said tube to provide a channel for the exhaust of fluid therefrom, means for supplying a flow of fluid to the upper portion of said tube, and means for limiting the degree of distortion of said tube.

21. In a gate for controlling the flow of water, a cylinder, an apron movably mounted on the periphery of said cylinder along an upper portion thereof with reference to the closed position of said gate, means for raising and lowering said apron from and toward the periphery of said cylinder, and latch means separate from the first said means for retaining said apron in its raised position.

22. In a gate for controlling the flow of water, a plurality of piers defining a spillway, water flow controlling means extending across the spillway, a column extending vertically from and supported by a foundation and set into each of said piers and extending therefrom along a portion of its length, and means for guiding the movement of said flow controlling means, the portions of said columns extending from said piers forming a direct support for said guiding means.

23. In a gate for controlling the flow of water, a plurality of piers defining a spillway, water flow controlling means extending across the spillway, a column extending vertically from and supported by a foundation and set into each of said piers and extending therefrom along a portion of its length, and a plurality of beams attached at the ends thereof to said columns, said columns and said attached beams forming a frame only partially enclosed in said piers, and means for guiding the movement of said flow controlling means, the exposed portions of said frame forming a direct support for said guiding means.

24. In a gate for controlling the flow of water, a plurality of piers defining a spillway and having recesses therein, a cylinder extending across the spillway, end heads primarily supported by the ends of said cylinder and extending from the ends of said cylinder into the recesses in said piers, the diameter of said cylinder being greater than the width of the recesses in said piers, an apron mounted along the top of said cylinder, and a cover member extending from the upper edge of said apron to the periphery of said cylinder on the downstream side thereof.

25. In a gate for controlling the flow of water, a plurality of piers defining a spillway and having recesses therein, a cylinder extending across the spillway, end heads primarily supported by the ends of said cylinder and extending from the ends of said cylinder into the recesses in said piers, the diameter of said cylinder being greater than the width of the recesses in said piers, an apron mounted on the upper portion of said cylinder, and a projection extending from the lower portion of said cylinder, both said apron and said projection being located upstream of a vertical plane passing through the axis of said cylinder.

26. In a gate for controlling the flow of water, a plurality of piers defining a spillway and having recesses therein, a cylinder extending across the spillway, end heads primarily supported by the ends of said cylinder and extending from the ends of said cylinder into the recesses in said piers, the diameter of said cylinder being greater than the width of the recesses in said piers, seals located on said piers for sealing the ends of said cylinder directly on said piers, an apron mounted on the upper portion of said cylinder, and a projection extending from the lower portion of said cylinder, both said apron and said projection being located upstream of a vertical plane passing through the axis of said cylinder.

27. In a gate for controlling the flow of water, a plurality of piers defining a spillway and having recesses therein, a cylinder extending across the spillway, end heads primarily supported by the ends of said cylinder and extending from the ends of said cylinder into the recesses in said piers, the diameter of said cylinder being greater than the width of the recesses in said piers, an apron mounted on the upper portion of said cylinder, a projection extending from the lower portion of said cylinder, both said apron and said projection being located upstream of a vertical plane passing through the axis of said cylinder, and a cover member extending from the upper edge of said apron to the periphery of said cylinder on the downstream side thereof.

28. In a gate for controlling the flow of water, a plurality of piers defining a spillway and having recesses therein, a cylinder extending across the spillway, end heads primarily supported by the ends of said cylinder and extending from the ends of said cylinder into the recesses in said piers, the diameter of said cylinder being greater than the width of the recesses in said piers, seals located on said pier for sealing the ends of said cylinder directly on said piers, an apron mounted on the upper portion of said cylinder, a projection extending from the lower portion of said cylinder, both said apron and said projection being located upstream of a vertical plane passing through the axis of said cylinder, a cover member extending from the upper edge of said apron to the periphery of said cylinder on the downstream side thereof, and a frame comprising a plurality of columns supported from a foundation and a plurality of substantially horizontal beams interconnecting said columns to form a vertical operating frame only partially enclosed within said piers, the exposed portions of said frame forming a direct support for said cylinder.

CHARLES R. MARTIN.